(12) United States Patent
Wines et al.

(10) Patent No.: US 12,094,441 B2
(45) Date of Patent: Sep. 17, 2024

(54) MUSIC CUSTOMIZATION USER INTERFACE

(71) Applicant: Marmoset, LLC, Portland, OR (US)

(72) Inventors: Ryan Wines, Portland, OR (US); Jonathan Minori, Portland, OR (US); Sam Alexander, Portland, OR (US)

(73) Assignee: MARMOSET, LLC, Portland, OR (US)

( * ) Notice: Subject to any disclaimer, the term of this patent is extended or adjusted under 35 U.S.C. 154(b) by 561 days.

(21) Appl. No.: 17/397,869

(22) Filed: Aug. 9, 2021

(65) Prior Publication Data

US 2023/0042616 A1   Feb. 9, 2023

(51) Int. Cl.
*G10H 1/00* (2006.01)
*G06F 3/0482* (2013.01)
(Continued)

(52) U.S. Cl.
CPC ......... *G10H 1/0008* (2013.01); *G06F 3/0482* (2013.01); *G06F 3/165* (2013.01);
(Continued)

(58) Field of Classification Search
CPC .. G10H 1/0008; G10H 1/46; G10H 2210/105; G10H 2210/325;
(Continued)

(56) References Cited

U.S. PATENT DOCUMENTS

D762,685 S * 8/2016 Eom ........................... D14/486
9,639,606 B2   5/2017 DeMers et al.
(Continued)

FOREIGN PATENT DOCUMENTS

CA        184882 S     8/2019
CN     304898415 S    11/2018
(Continued)

OTHER PUBLICATIONS

Screen captures from blue dot sessions website; Retrieved from the Internet: <URL: https://app.sessions.blue/;> Retrieved on Aug. 9, 2021, 1 page.
(Continued)

*Primary Examiner* — Christina M Schreiber
(74) *Attorney, Agent, or Firm* — Alleman Hall & Tuttle LLP

(57) ABSTRACT

Computing devices and methods for providing a music customization graphical user interface (GUI) to a user computing device are disclosed. The music customization GUI comprises song name selectors that each correspond to a different song and a music player region that includes a song customization selector. A customization window comprises music stem indicators that each correspond to at least one music stem of a selected song. The customization window also comprises mixing buttons that include a first mixing button configured to add a corresponding music stem to a user song mix, and a second mixing button configured to remove the music stem from the user song mix. A download button is configured to download a file comprising the user song mix to a user computing device.

20 Claims, 11 Drawing Sheets

(51) Int. Cl.
  *G06F 3/16* (2006.01)
  *G10H 1/46* (2006.01)
(52) U.S. Cl.
  CPC ......... *G10H 1/46* (2013.01); *G10H 2210/105* (2013.01); *G10H 2210/325* (2013.01); *G10H 2210/381* (2013.01); *G10H 2220/116* (2013.01)
(58) Field of Classification Search
  CPC ........ G10H 2210/381; G10H 2220/116; G06F 3/0482; G06F 3/165
  USPC .......................................................... 84/601
  See application file for complete search history.

(56) References Cited

U.S. PATENT DOCUMENTS

| | | | | |
|---|---|---|---|---|
| D793,424 S | * | 8/2017 | Bao | D14/488 |
| D802,622 S | * | 11/2017 | Clymer | D14/487 |
| D803,257 S | * | 11/2017 | Graham | D14/487 |
| D823,867 S | * | 7/2018 | Berlow | D14/486 |
| D825,596 S | * | 8/2018 | Cannata | D14/486 |
| D843,403 S | * | 3/2019 | Casse | D14/486 |
| D847,852 S | * | 5/2019 | Sapre | D14/488 |
| D854,565 S | * | 7/2019 | McLaughlin | D14/488 |
| D866,586 S | * | 11/2019 | Suter | D14/488 |
| D883,321 S | * | 5/2020 | Clymer | D14/487 |
| D914,740 S | * | 3/2021 | Clymer | D14/487 |
| D945,461 S | * | 3/2022 | Wittke | D14/486 |
| D962,982 S | * | 9/2022 | Wolff | D14/487 |
| 2006/0117261 A1 | * | 6/2006 | Sim | H04S 7/302 715/727 |
| 2006/0180007 A1 | * | 8/2006 | McClinsey | G10H 1/0008 84/645 |
| 2007/0039031 A1 | * | 2/2007 | Cansler, Jr. | H04N 21/8113 725/110 |
| 2008/0098875 A1 | * | 5/2008 | Chen | G11B 27/11 84/609 |
| 2008/0115655 A1 | * | 5/2008 | Weng | G10H 1/0008 84/609 |
| 2009/0063975 A1 | * | 3/2009 | Bull | G06F 16/68 707/999.005 |
| 2009/0139389 A1 | * | 6/2009 | Bowen | G10H 1/0008 84/636 |
| 2010/0132536 A1 | * | 6/2010 | O'Dwyer | G10H 1/40 700/94 |
| 2010/0199833 A1 | * | 8/2010 | McNaboe | G10H 1/0025 84/625 |
| 2011/0112672 A1 | * | 5/2011 | Brown | G11B 27/28 700/94 |
| 2012/0023405 A1 | * | 1/2012 | Hyman | G06F 16/639 715/716 |
| 2013/0024771 A1 | * | 1/2013 | Satterley | H04L 65/612 715/748 |
| 2013/0031220 A1 | * | 1/2013 | Moncavage | H04N 21/8113 709/219 |
| 2013/0339853 A1 | * | 12/2013 | Hierons | G06F 16/686 715/716 |
| 2014/0095998 A1 | * | 4/2014 | Bull | G06F 3/048 715/716 |
| 2014/0355789 A1 | * | 12/2014 | Bohrarper | H04N 21/44016 381/119 |
| 2015/0052435 A1 | * | 2/2015 | DeMers | G06F 3/04817 715/716 |
| 2017/0195388 A1 | * | 7/2017 | Chaudhri | H04L 65/612 |
| 2019/0325854 A1 | * | 10/2019 | Kovacs | G10H 1/0025 |
| 2020/0357371 A1 | * | 11/2020 | Rein | G10H 1/361 |
| 2021/0125592 A1 | * | 4/2021 | Rein | G10H 1/46 |
| 2021/0191973 A1 | * | 6/2021 | Marchini | G06F 16/686 |
| 2022/0100459 A1 | * | 3/2022 | Nathanson | G06F 3/0483 |
| 2023/0042616 A1 | * | 2/2023 | Wines | G06F 3/0482 |

FOREIGN PATENT DOCUMENTS

| | | | | |
|---|---|---|---|---|
| CN | 305342561 S | | 9/2019 | |
| CN | 306261988 S | | 1/2021 | |
| CN | 113282270 A | * | 8/2021 | ........... G06F 16/639 |
| CN | 306786442 S | | 8/2021 | |
| CN | 306832209 S | | 9/2021 | |
| EP | 4134947 A1 | * | 2/2023 | ........... G06F 3/0482 |

OTHER PUBLICATIONS

Screen capture from Epidemic Sound website; Retrieved from the Internet: <URL: https://www.epidemicsound.com/music/genres/beats/;> Retrieved on Aug. 9, 2021, 1 page.
Screen capture from Filmstro website; Retrieved from the Internet: <URL: https://filmstro.com/products;> Retrieved on Aug. 9, 2021, 1 page.
Screen captures from YouTube video entitled "Extrememusic.com Tutorials: Stem Mixer," Available Online at https://youtu.be/BJNSaKZFyJI, uploaded on May 20, 2019, 3 pages.
Screen captures from YouTube video entitled "Extrememusic.com Tutorials: Customix," Available Online at https://youtu.be/4xiRXWKhll8, uploaded on May 20, 2019, 4 pages.
"Alama," Alama Website, Available Online at https://www.alama.co/, Available as Early as Aug. 9, 2020, 2 pages.
European Patent Office, Extended European Search Report Issued in Application No. 22188495.0, Jan. 10, 2023, Germany, 11 pages.

* cited by examiner

MUSIC CUSTOMIZATION USER INTERFACE

BACKGROUND

Music is often matched to visual and spoken content to add emotional value and create powerful experiences for listeners and viewers. For higher budget productions, custom composers may be utilized to craft original scores. These customized songs naturally emphasize significant parts of the film, spoken word or other content, creating engaging experiences for viewers and listeners. However, custom compositions can be prohibitively expensive to commission, particularly for smaller budget and resource-constrained content-producers and artists. Commissioning a custom composition can also impact the production schedule of a creative project, particularly when using the most skilled composers who are in high demand and have significant lead times.

Especially for smaller budget and resource-constrained content-producers and artists, such as a YouTube content creator, licensing one or more existing songs for use with their content can be helpful. However, it is often technically difficult or impossible for such producers and artists to edit, alter or otherwise customize an existing song to fit their particular content. For example, professional digital editing tools utilize complex user interfaces requiring technical savvy along with considerable instruction and study to use effectively. These tools also require digital music files that have been produced in particular manners and formats to enable editing. For the typical smaller budget and resource-constrained content-producer or artist, attempting to import, reformat, edit, and recompile a composed digital music file (such as an .mp3 file) using a professional audio editing tool is often prohibitively complicated. Further and as noted, these tools utilize elaborate user interfaces that can easily overwhelm and frustrate many users. Additionally, licensing restrictions can prevent users from modifying an existing song.

SUMMARY

Various examples are disclosed herein that relate to providing a music customization graphical user interface that provides a simple, intuitive, and user-friendly interface that enables users to customize and download licensed digital music and music stems. As described in more detail below, the unique presentations and groupings of elements and user-selectable functional features in the music customization graphical user interfaces of the present disclosure enable users to quickly, easily, and efficiently customize selected songs and/or music stems and download the results.

One example provides a host computing device for providing a music customization graphical user interface to a user computing device, the host computing device comprising a communication subsystem for communicatively coupling the host computing device to the user computing device and a logic subsystem. A storage subsystem comprises instructions executable by the logic subsystem to send the music customization graphical user interface to the user computing device, where the music customization graphical user interface comprises: a plurality of user-selectable song name selectors configured to receive user input, wherein each of the user-selectable song name selectors corresponds to a different song, and a selected song name selector of the plurality of song name selectors is selected by a user; a music player region comprising a title of a selected song that corresponds to the selected song name selector, a user-selectable play button, and a user-selectable song customization selector, wherein the selected song comprises a plurality of music stems; a customization window comprising: a plurality of music stem indicators that each correspond to at least one music stem of the plurality of music stems; and a plurality of user-selectable mixing buttons comprising: a first user-selectable mixing button corresponding to each music stem indicator of the plurality of music stem indicators, the first mixing button configured to add the music stem corresponding to a nearest music stem indicator to a user song mix; and a second user-selectable mixing button located adjacent to the first mixing button, the user-selectable second mixing button configured to remove the music stem corresponding to the nearest music stem selector from the user song mix; and a user-selectable download button configured to download a file comprising the user song mix to the user computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure provides computing devices and methods that enable users to easily customize, preview, and download licensed digital music and music stems. As described in more detail below, the present disclosure provides a music customization graphical user interface (GUI) that provides a user with simple and intuitive user-selectable elements that are organized and presented in a manner that enables a user to easily select and customize one or more music stems from a selected song to create a bespoke musical soundtrack for other content.

Figure 1:
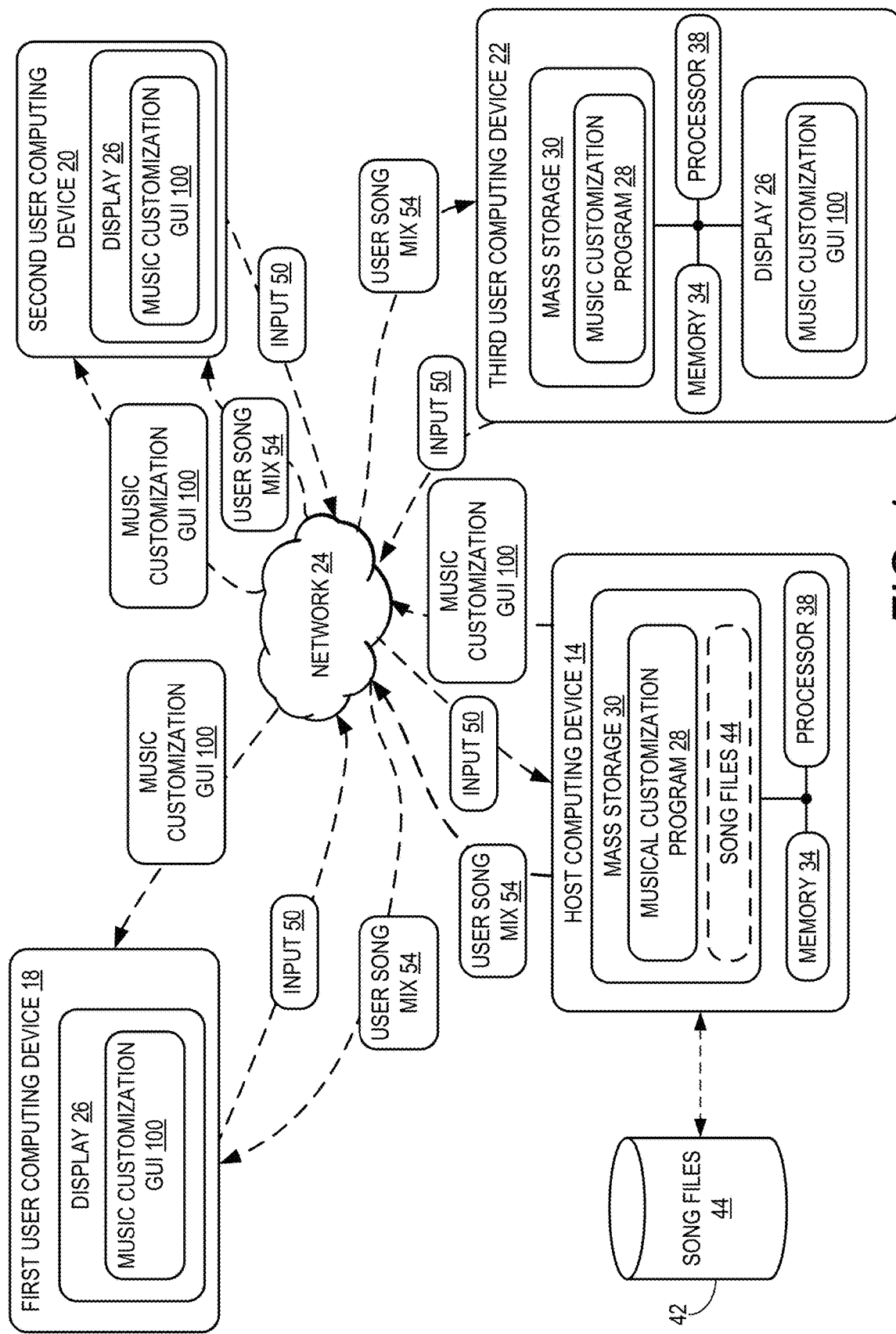
FIG. 1 is a schematic view of a host computing device and user computing devices according to an example of the present disclosure.

FIG. 1 shows a schematic view of an example use case environment in which one or more aspects of the present disclosure may be utilized. In the example of FIG. 1, a host computing device 14 is communicatively coupled with a first user computing device 18, second user computing device 20, and third user computing device 22 via network 24. As described in more detail below, each of the user computing devices may include a display 26 that displays a music customization GUI 100. Network 24 may take the form of a local area network (LAN), wide area network (WAN), wired network, wireless network, personal area network, or a combination thereof, and may include the Internet. It will be appreciated that in other examples, the host computing device 14 may be communicatively coupled with fewer or more user computing devices.

Host computing device 14 may be configured with program instructions according to examples of the present disclosure. Such program instructions may implement one or more of the methods and processes described in more detail below. In the example of FIG. 1, host computing device 14 includes a music customization program 28 that may be stored in mass storage 30 of the host computing device. The music customization program 28 may be loaded into memory 34 and executed by a processor 38 of the host computing device 14 to perform one or more of the methods and processes described in more detail below.

The host computing device 14 may take the form of a network computing device such as a server, desktop computing device, mobile computing device such as a smart phone, laptop, notebook or tablet computer, or other suitable type of computing device. Additional details regarding the components and computing aspects of the host computing device 14 are described in more detail below with reference to FIG. 9.

The host computing device 14 may be communicatively coupled to a database 42 that contains a plurality of digital song files 44. The song files 44 may be stored in any suitable file format such as, for example, MP3, AAC, FLAC, WAV, AIFF, PCM or any other suitable format. In other examples, and in addition to or instead of the database 42, song files 44 may be stored in mass storage 30 of the host computing device 14. Each of the song files 44 is organized into a plurality of music stems, where each stem represents a section or portion of the song. In some examples, a music stem corresponds to a single instrument, voice or other harmonic element (such as, for example, a lead guitar) in the song. In other examples, a music stem corresponds to two or more harmonic elements that are layered together (such as, for example, "guitars" that include lead and rhythm guitars, "vocals" that include lead and background vocals, etc.).

Aspects of this disclosure will now be described with reference to illustrated example screens of a music customization GUI 100 displayed on a user computing device. As illustrated in FIG. 1, in some examples the music customization GUI 100 may be generated by host computing device 14 and sent to one or more user computing devices, such as first user computing device 18 and second user computing device 20. In some examples, the music customization GUI 100 may comprise a dynamic web page that may be displayed by such devices via, for example, a web browser.

As described in more detail below, a user provides input 50 to host computing device 14 via one or more selectors and/or other user-selectable features of the music customization GUI 100. Using such input 50 the music customization program 28 may perform a variety of functions, such as causing one or more aspects of a selected song to be modified, selecting and/or modifying one or more music stem(s) from the song, and generating and uploading to a user computing device a file containing a resulting user song mix 54. The resulting user song mix 54 may be generated and broadcast to the user via the user's computing device and a music player region of the GUI 100. In some examples, the user song mix 54 may be generated and played using the browser of the user's computing device (i.e., via the browser's WebAudio capabilities). In other examples, the user song mix 54 may be streamed from the host computing device 14 to the user's computing device. When the user is satisfied with a particular user song mix 54, the user can then select a download selector from the music customization GUI 100 to download a file containing the user song mix to the user computing device and/or save the file comprising the user song mix to the host computing device 14.

In other examples, the music customization program 28 may be stored in mass storage 30 of a user computing device, such as third user computing device 22. The music customization program 28 may be loaded into memory 34 and executed by a processor 38 of the third user computing device 22 to perform one or more of the methods and processes described in more detail below. In these examples, third user computing device 22 may be configured with program instructions according to examples of the present disclosure. Such program instructions may implement one or more of the methods and processes described in more detail below. As shown in FIG. 1, in this example the music customization program 28 may generate the music customization GUI 100, send input 50 to host computing device 14, and receive a user song mix 54 from the host computing device.

In various examples, the user computing devices may take the form of a desktop computing device, mobile computing device such as a smart phone, laptop, notebook or tablet computer, head mounted display device, or other suitable type of computing device. Additional details regarding the components and computing aspects of the user computing devices are described in more detail below with reference to FIG. 9.

Figure 2:
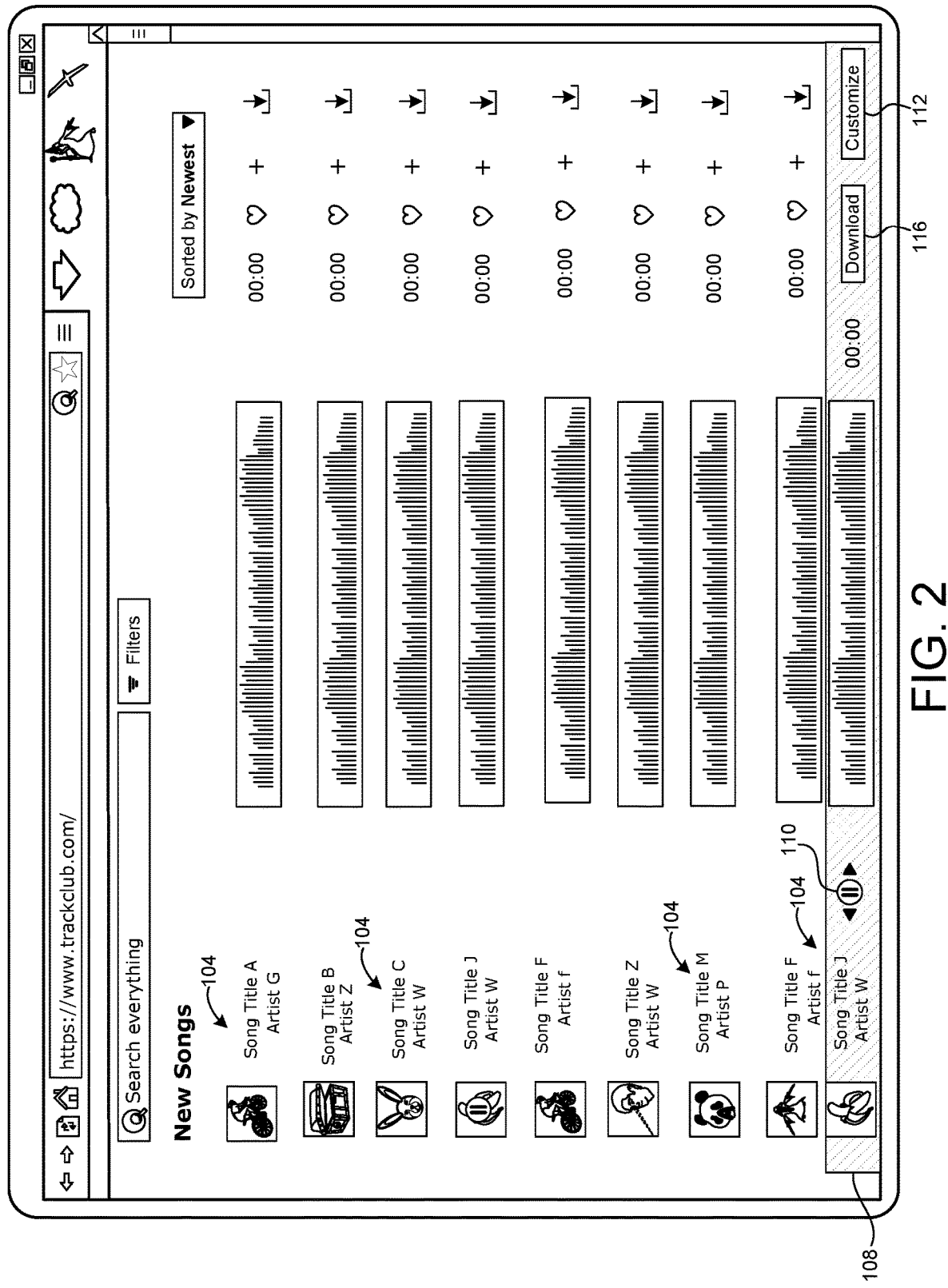
FIG. 2 is a schematic view of a music customization graphical user interface (GUI) displayed on a user computing device according to an example of the present disclosure.

With reference now to FIG. 2, a schematic illustration of an example screen of a music customization GUI 100 according to an example of the present disclosure is provided. In this example, the music customization GUI 100 includes a plurality of user-selectable song name selectors 104 that are each configured to receive user input, such as by user selection via a displayed pointer or touchscreen input. In this example, each song name selector 104 includes a thumbnail image, song title and artist name, one or all of which may be user-selectable. Each of the user-selectable song name selectors 104 corresponds to a different song and corresponding song file 44 stored in database 42 and/or mass storage 30 of the host computing device 14.

In this example, the user has selected the song name selector 104 of the song entitled Song Title J. Upon this selection, a music player region 108 displays Song Title J. The music player region includes a user-selectable play button 110, a user-selectable song customization selector 112, and a user-selectable download button 116 configured to download a file of Song Title J.

Figure 3:
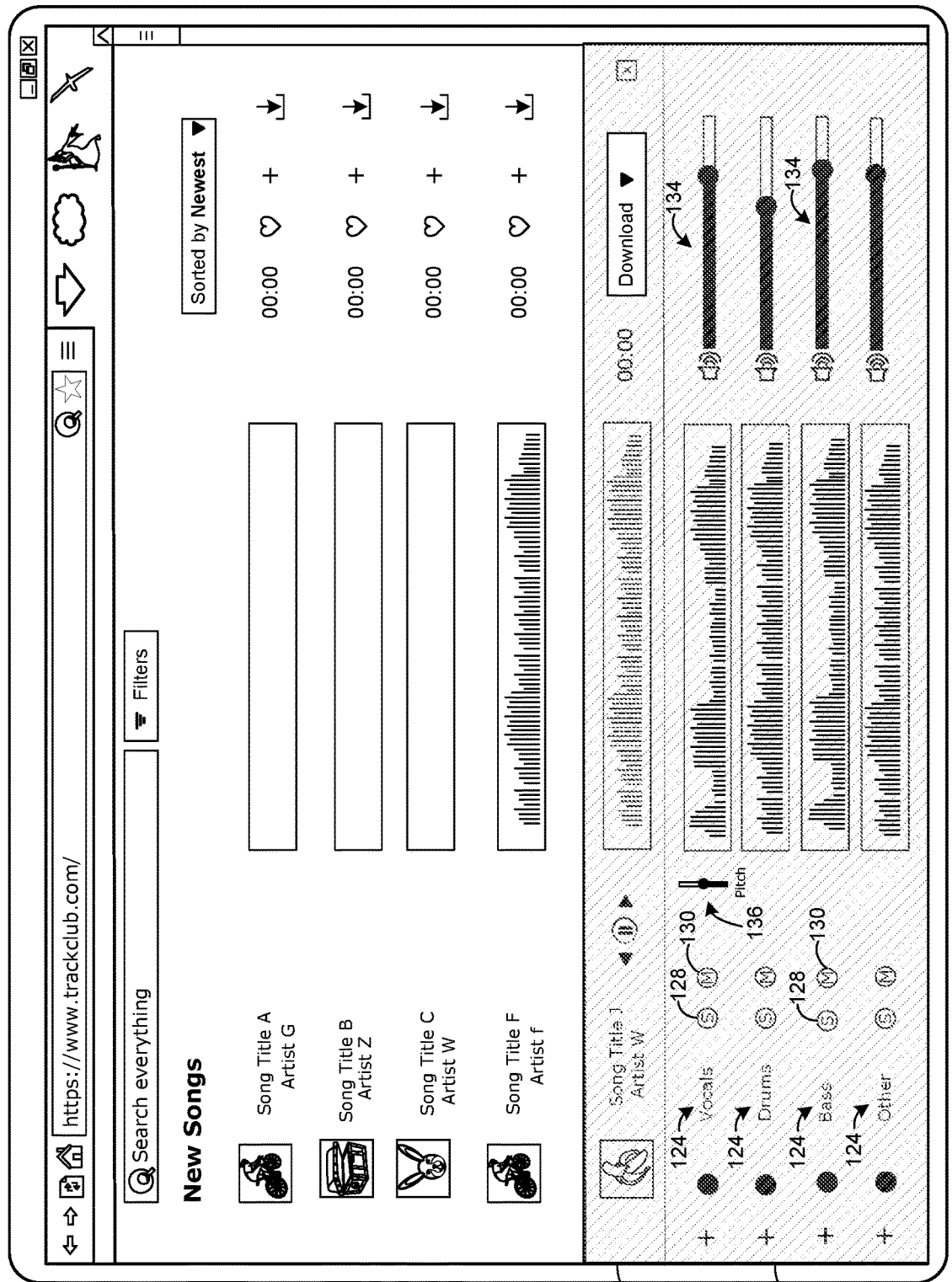
FIG. 3 is a schematic view of the music customization GUI and a customization window according to another example of the present disclosure.

With reference now to FIG. 3, and in response to a user selection of the song customization selector 112, a customization window 120 is displayed in GUI 100. As described in more detail below, in different examples the customization window 120 includes a plurality of music stem categories and/or music stem indicators that each correspond to at least one music stem of the plurality of music stems in the selected song. In this example, and in one potential advantage of the present disclosure, upon the user's selection of the song customization selector 112 the GUI 100 displays a customization window 120 that includes a plurality of user-selectable music stem categories 124, where each of the music stems of the selected song is contained in one of the user-selectable music stem categories 124. In this example for Song Title J, four user-selectable music stem categories 124 are displayed for the song—Vocals, Drums, Bass, and Other. Accordingly, and in one potential advantage of the present disclosure, by organizing and collecting all of the music stems into one of a limited number of user-selectable music stem categories 124 and displaying these categories, the user is presented with a simple, consolidated, and easy-to-view interface that she may utilize to quickly and efficiently manipulate different groups of related music stems, as described further below, to customize a selected song.

Each music stem category 124 may include one or more music stems of an individual track (e.g., lead vocal, single background vocal). Additionally or alternatively, each music stem category 124 may include one or more packaged group music stems that each include two or more individual track music stems layered together (e.g., a "background vocals" music stem that layers three background vocal tracks together). Additionally and as described in more detail below, each of the user-selectable music stem categories 124 is configured to expand and display one or more music stem indicators of the music stems assigned to the music stem category upon receiving a user selection of the user-selectable music stem category.

With continued reference to FIG. 3, and in one potential advantage of the present disclosure, to enable a user to easily create custom user mixes of the different music stems in the selected song, the customization window 120 of GUI 100 includes user-selectable mixing buttons that are displayed with each music stem category 124. In the example of FIG. 3, a first user-selectable mixing button 128 (in this example designated "S" for "solo") is configured to add all of the music stems within the corresponding user-selectable music stem category 124 to the user song mix. For example, where the "Vocals" music stem category 124 contains a lead vocal stem, harmony vocal stem, and background vocals stem, selecting the first user-selectable mixing button 128 adds all three of these vocal stems to the user song mix. In this example, a first user-selectable mixing button 128 is displayed horizontally adjacent to each user-selectable music stem category 124 to provide the user with an intuitive and easy-to-use interface for quickly adding different music stem categories to the user song mix.

In the example of FIG. 3, the customization window 120 also includes a second user-selectable mixing button 130 (designated "M" for "mute") that is configured to remove all of the music stems within the corresponding user-selectable music stem category 124 from the user song mix. For example, selecting the second user-selectable mixing button 130 displayed with the "Vocals" music stem category 124 removes all the vocal stems within this category from the user song mix to create an instrumental mix. In this example, a second user-selectable mixing button 130 is displayed adjacent to each first user-selectable mixing button 128 to enable the user to quickly and easily remove different music stem categories from the user song mix.

In the example of FIG. 3, the customization window 120 further comprises a user-adjustable volume level adjuster 134 displayed with each of the user-selectable music stem categories 124. The user-adjustable volume level adjuster 134 is configured to adjust a volume of all of the music stems within the corresponding user-selectable music stem category 124 in the user song mix. Advantageously and in this manner, the customization window 120 of GUI 100 enables the user to easily and individually control the volume of all music stems within a given music stem category 124.

In some examples of the present disclosure, a customization window of a music customization GUI includes a user-adjustable pitch adjuster displayed with one or more of the selectable music stem categories, where the user-adjustable pitch adjuster is configured to adjust a pitch of all the music stems within the corresponding music stem category within the user song mix. In the example of FIG. 3, a user-adjustable pitch adjuster 136 is displayed with the user-selectable music stem category 124 for Vocals. In some examples, in addition to or instead of individual user-adjustable pitch adjusters for each music stem category, an overall user-selectable pitch adjuster may be provided to enable the user to adjust the pitch of all the music stems in the current user song mix.

Figure 4:
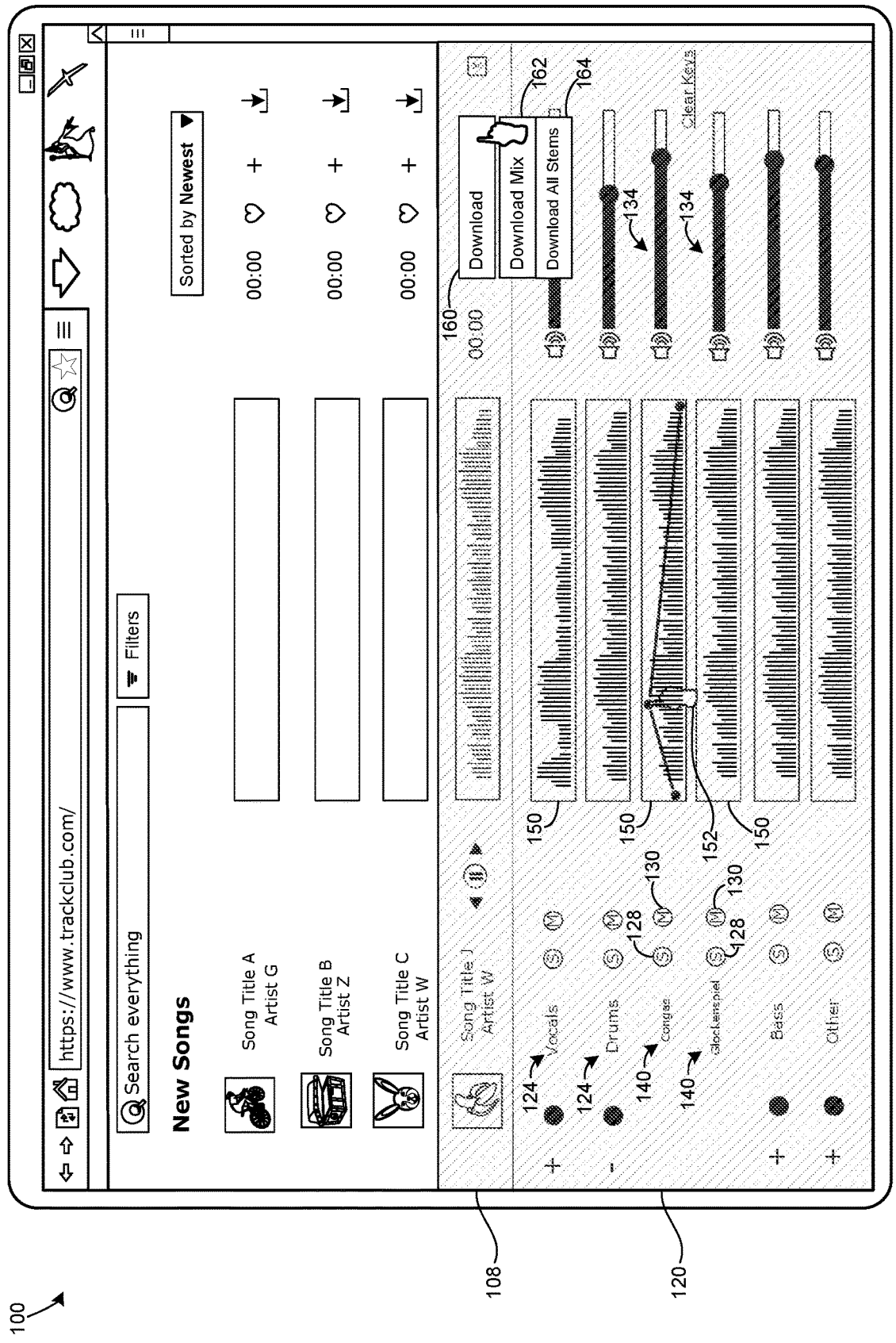
FIG. 4 is another schematic view of the music customization GUI and the customization window according to another example of the present disclosure.

With reference now to FIG. 4, in one potential advantage of the present disclosure and as noted above, each of the user-selectable music stem categories 124 is expandable to display one or more music stem indicators of the music stems assigned to the music stem category upon receiving a user selection of the user-selectable music stem category. In the example of FIG. 4, the Drums user-selectable music stem category 124 has been selected and expanded to reveal two music stems (Congas and Glockenspiel) that are represented by corresponding music stem indicators 140.

Advantageously, in addition to providing the option of customizing all the music stems within the user-selectable music stem categories 124, the customization window 120 also allows the user to visualize and customize each music stem within any of the displayed music stem categories quickly, easily, and efficiently by selecting the corresponding user-selectable music stem category 124. In this example, a first user-selectable mixing button 128 and second user-selectable mixing button 130 are displayed with each music stem within a selected music stem category. Each first user-selectable mixing button 128 is configured to add the corresponding music stem to the user song mix. For example, selecting the first user-selectable mixing button 128 adjacent to the Congas music stem indicator 140 adds the Congas music stem to the user song mix. In this example, a first user-selectable mixing button 128 is displayed horizontally adjacent to each music stem indicator 140 in the selected Drums category to provide the user with an intuitive and easy-to-use interface for quickly adding different music stems to the user song mix.

Similarly, the second user-selectable mixing button 130 is configured to remove the corresponding music stem from the user song mix. For example, selecting the second user-selectable mixing button 130 displayed with the Glockenspiel music stem indicator 140 removes the Glockenspiel music stem from the user song mix. In this example, a second user-selectable mixing button 130 is displayed adjacent to each first user-selectable mixing button 128 to enable the user to remove different music stems quickly and easily from the user song mix.

Additionally, the customization window 120 further comprises a user-adjustable volume level adjuster 134 that is displayed with each of the displayed music stem indicators 140. Advantageously, these user-adjustable volume level adjusters 134 enable the user to easily adjust a volume of the corresponding music stem within the user song mix.

Figure 5:
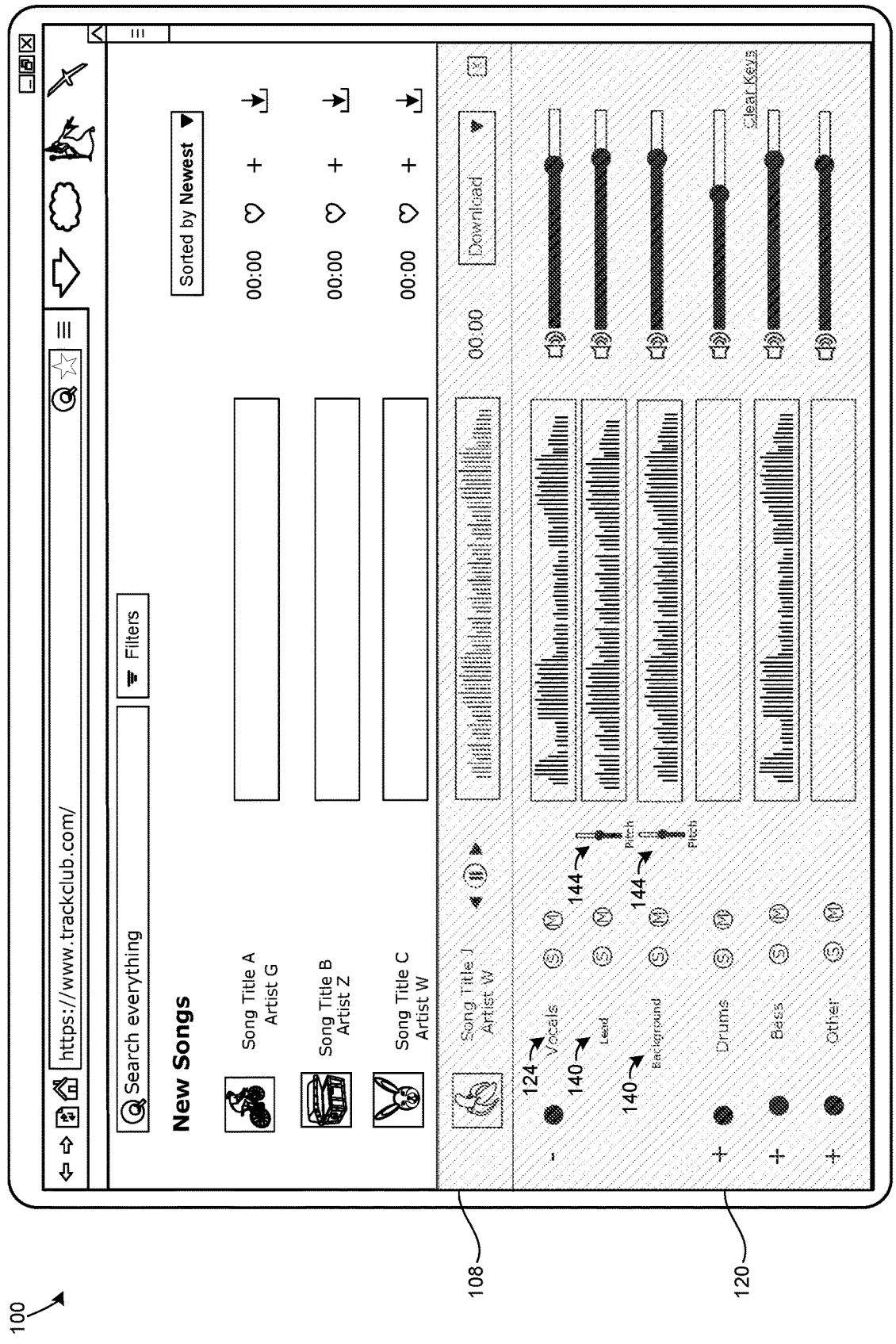
FIG. 5 is another schematic view of the music customization GUI and the customization window according to another example of the present disclosure.

In some examples, the customization window 120 may include a user-adjustable pitch adjuster that is displayed with one or more of the music stem indicators to allow the user to individually adjust the pitch of a corresponding music stem. With reference now to FIG. 5, in this example the user has selected the Vocals user-selectable music stem category 124 which reveals a Lead vocals user-selectable music stem indicator 140 and a Background vocals user-selectable music stem indicator 140. A user-adjustable pitch adjuster 144 is displayed with each of the Lead vocals user-selectable music stem indicator 140 and the Background vocals user-selectable music stem indicator 140. Advantageously, providing and displaying the user-adjustable pitch adjusters 144 in this manner enables the user to easily adjust the pitch of the corresponding music stem within the user song mix.

Figure 6:
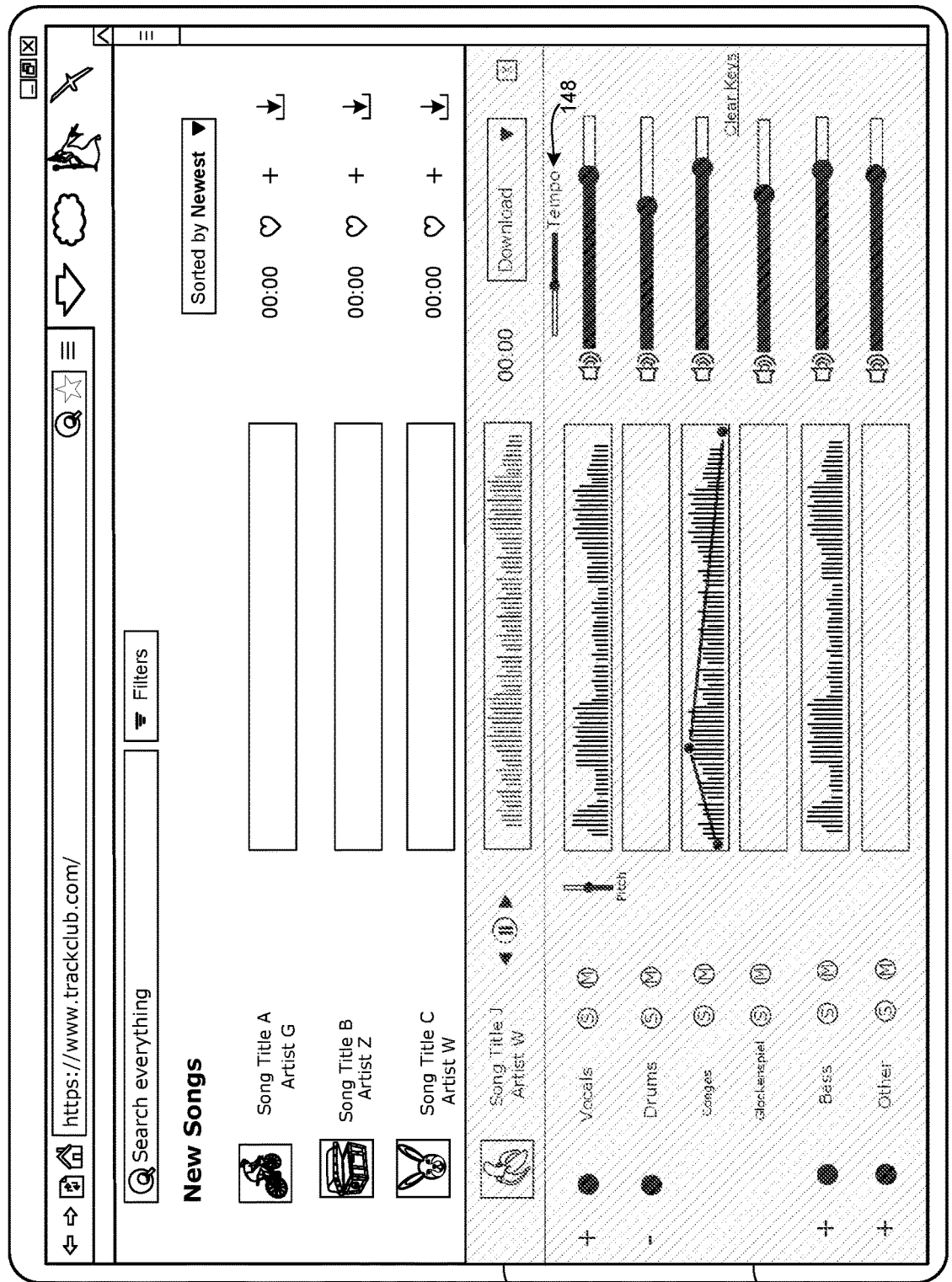
FIG. 6 is another schematic view of the music customization GUI and the customization window according to another example of the present disclosure.

In some examples, the customization window 120 may include a user-adjustable tempo adjuster that is configured to adjust the tempo of the user song mix. In one example and with reference now to FIG. 6, a user-adjustable tempo adjuster 148 is displayed in the customization window 120. Advantageously, providing and displaying a user-adjustable tempo adjuster 148 in this manner enables the user to easily adjust the tempo of the user song mix.

With reference again to FIG. 4, in some examples a waveform region 150 is provided and displayed for each of the music stem indicators 140. The waveform region 150 provides a visual depiction of the audio waveform of a corresponding music stem. In some examples, each waveform region 150 is configured to receive a user volume selection and to adjust a volume of the corresponding music stem based on a location of the user volume selection within the waveform region. In the example of FIG. 4, the user has moved a pointer 152 to the location shown within the waveform region 150 adjacent to the Congas music stem indicator 140. When the user makes a user volume selection by selecting this location within the waveform region 150, the customization window 120 functions to adjust the volume of the Congas music stem in the user song mix at this temporal location in the selected Song Title J. Advantageously, in these examples the customization window 120 provides the user with a visually simple and easy-to-manipulate interface that enables the user to make such key level volume adjustments to one or more of the music stems.

Figure 7:
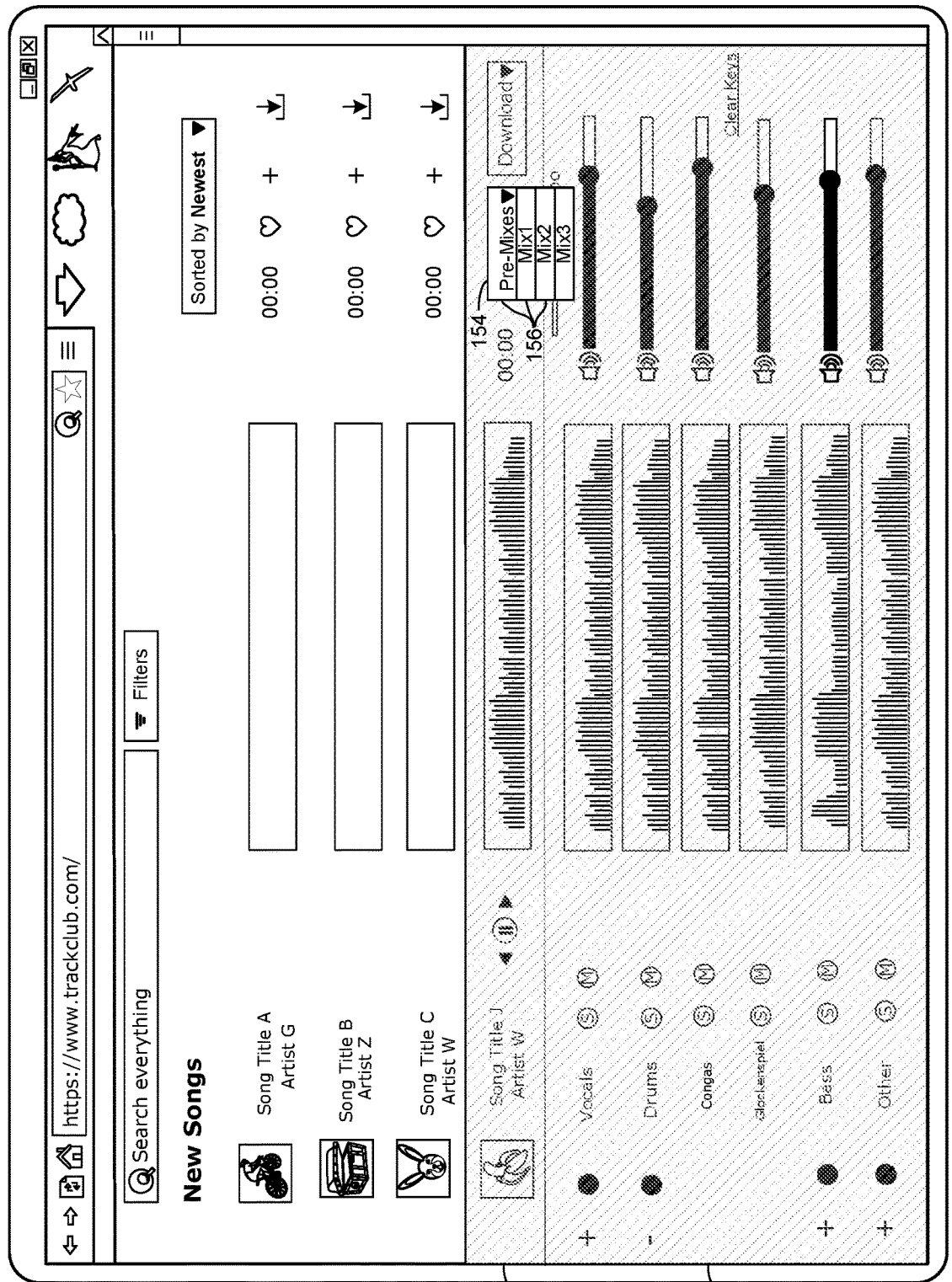
FIG. 7 is another schematic view of the music customization GUI and the customization window according to another example of the present disclosure.

In some examples, the customization window 120 may include a plurality of user-selectable preset mix selectors, wherein each of the user-selectable preset mix selectors corresponds to a different collection of music stems from the selected song and/or different musical attributes (tempo, pitch, volume, etc.) for these music stems. With reference now to FIG. 7, in one example the customization window 120 displays a user-selectable Preset Mixes menu 154. Upon selection by the user, the Preset Mixes menu 154 displays a drop-down menu of different user-selectable preset mix indicators 156 that each correspond to a different collection of music stems from the selected song and/or different musical attributes (tempo, pitch, volume, etc.) for these music stems. When the user selects one of the preset mix indicators 156, the corresponding collection of music stems from the selected song is selected for the user song mix and the different musical attributes (tempo, pitch, volume, etc.) are applied to the user song mix. In this manner, and in another potential advantage of the present disclosure, providing a plurality of preset mixes of different music stems and/or different musical attributes (tempo, pitch, volume, etc.) of the selected song enables the user to preview and select predetermined mixes of the selected song quickly and easily.

When the user has selected and in some examples customized one or more stems from the selected song using the customization window 120 to create the user song mix, the user may then download a file comprising the user song mix to the user computing device and/or save a file of the user song mix to the host computing device 14. With reference again to FIG. 4, in one example the customization window 120 includes at least one user-selectable download button that is configured to download a file comprising the user song mix to the user computing device and/or save the file comprising the user song mix to the host computing device 14. In this example, upon the user selecting a user-selectable download menu 160, two user-selectable download buttons are displayed—a Download Mix button 162 that is configured to download a file comprising the user song mix to the user computing device, and a Download All Stems button 164 that is configured to download a file comprising all of the music stems contained in the selected song to the user computing device. In this manner, when the user has selected and/or customized the stems from the selected song to create the user song mix, the user can easily and quickly download a file of the user song mix. Alternatively, by simply selecting the Download All Stems button 164, the user can easily download all of the music stems contained in the selected song.

Figure 8A:
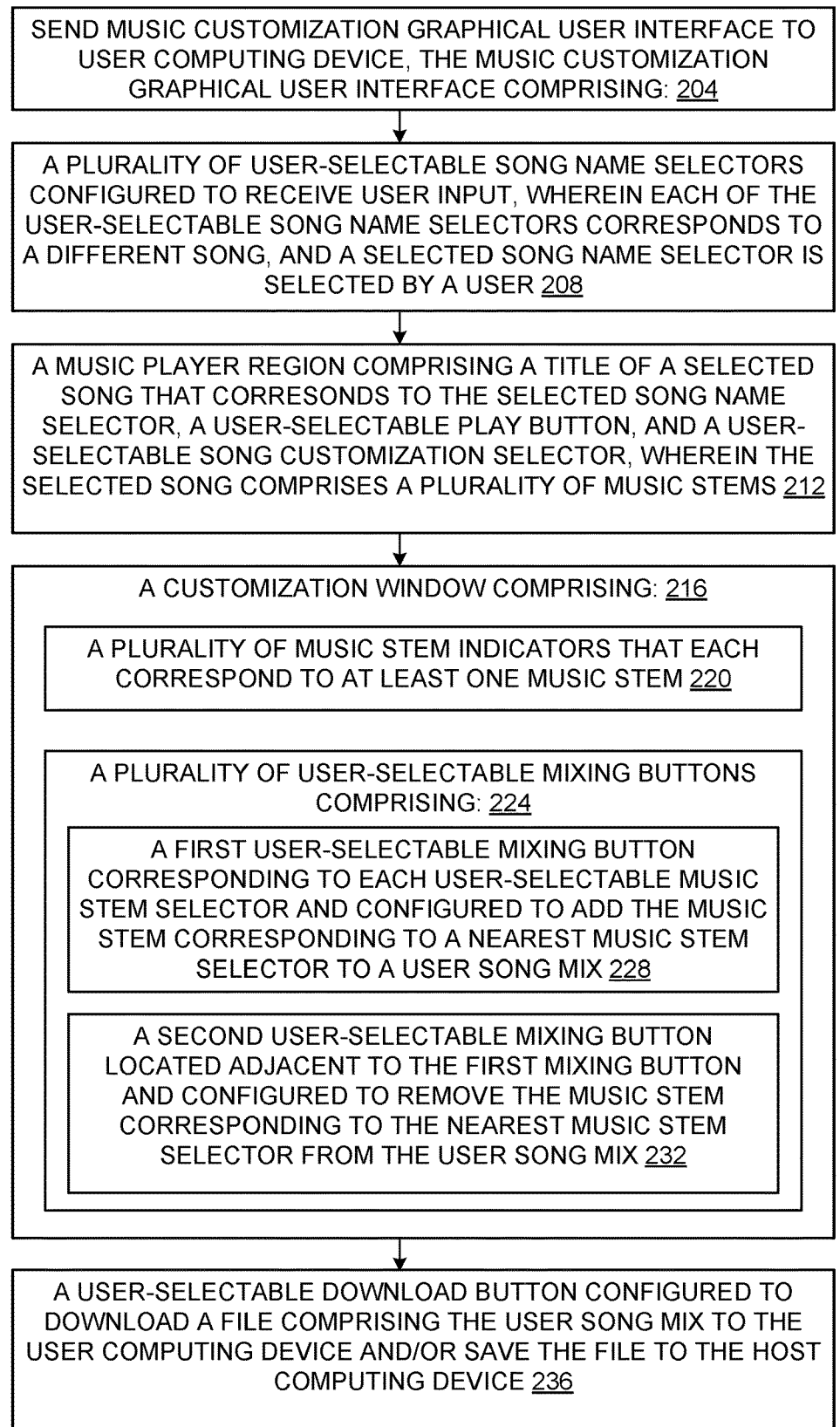
FIGS. 8A, 8B, and 8C are a flow chart of a method for providing a music customization GUI to a user computing device according to an example of the present disclosure.
Figure 8B:
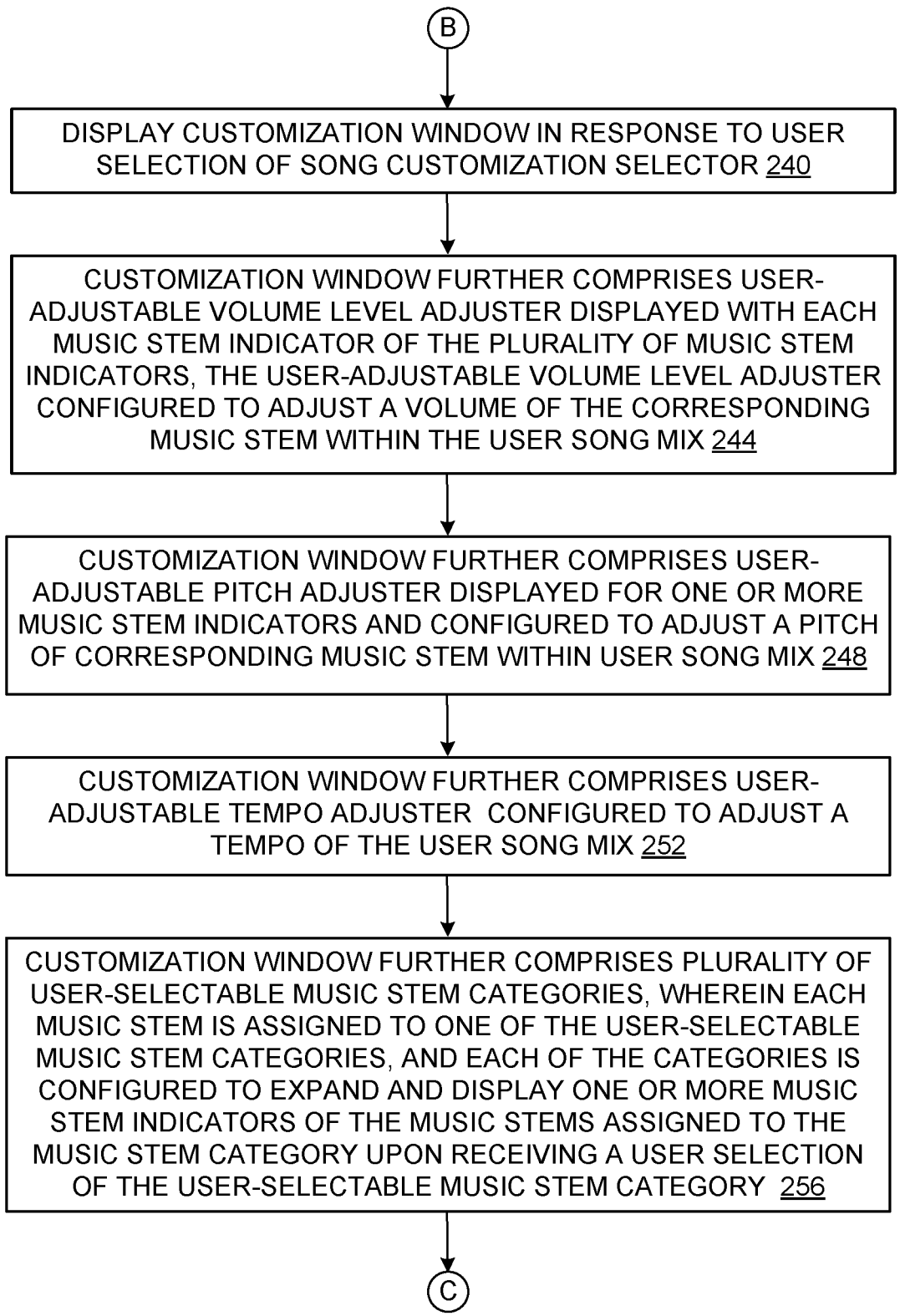
Figure 8C:
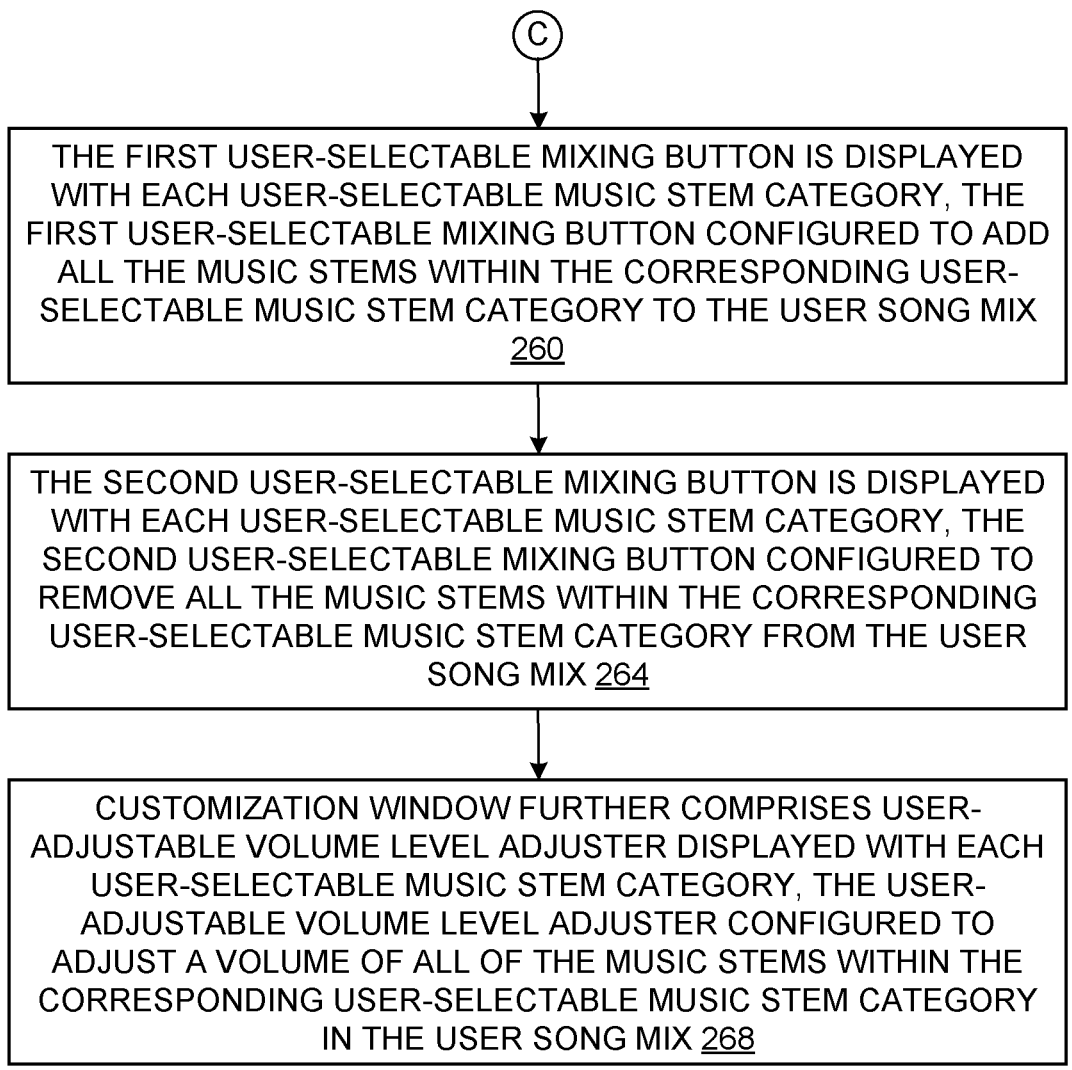

With reference now to FIGS. 8A-8C, a flow diagram is illustrated depicting an example method 200 for providing a music customization graphical user interface to a user computing device. The following description of method 200 is provided with reference to the software and hardware components described herein and shown in FIGS. 1-7 and 9. For example, the method 400 may be performed by host computing device 14, hardware, software, and/or firmware of the host computing device 14, or a suitable combination of components described herein.

It will be appreciated that the following description of method 200 is provided by way of example and is not meant to be limiting. Therefore, it is to be understood that method 200 may include additional and/or alternative steps relative to those illustrated in FIGS. 8A-8C. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 8A, at 204 the method 200 includes sending the music customization graphical user interface (GUI) to the user computing device. At 208 the music customization GUI comprises a plurality of user-selectable song name selectors configured to receive user input, wherein each of the user-selectable song name selectors corresponds to a different song, and a selected song name selector of the plurality of song name selectors is selected by a user. At 212 the music customization GUI comprises a music player region comprising a title of a selected song that corresponds to the selected song name selector, a user-selectable play button, and a user-selectable song customization selector, wherein the selected song comprises a plurality of music stems.

At 216 the music customization GUI comprises a customization window comprising: at 220, a plurality of music stem indicators that each correspond to at least one music stem of the plurality of music stems; at 224, a plurality of user-selectable mixing buttons comprising: at 228, a first user-selectable mixing button corresponding to each music stem indicator of the plurality of music stem indicators, the first mixing button configured to add the music stem corresponding to a nearest music stem selector to a user song mix; and at 232, a second user-selectable mixing button located adjacent to the first mixing button, the second mixing button configured to remove the music stem corresponding to the nearest music stem selector from the user song mix. At 236 the music customization GUI comprises a user-selectable download button configured to download a file comprising the user song mix to the user computing device and/or save the file comprising the user song mix to the host computing device.

With reference now to FIG. 8B, at 240 the method 200 comprises displaying the customization window in response to a user selection of the song customization selector. At 244 the method 200 includes, wherein the customization window further comprises a user-adjustable volume level adjuster displayed with each music stem indicator of the plurality of music stem indicators, the user-adjustable volume level adjuster configured to adjust a volume of the corresponding music stem within the user song mix. At 248 the method 200 includes, wherein the customization window further comprises a user-adjustable pitch adjuster displayed with one or more of the music stem indicators, the user-adjustable pitch adjuster configured to adjust a pitch of the corresponding music stem within the user song mix. At 252 the method 200 includes, wherein the customization window further comprises a user-adjustable tempo adjuster configured to adjust the tempo of the user song mix. At 256 the method 200 includes, wherein the customization window further comprises a plurality of user-selectable music stem categories, wherein each music stem of the plurality of music stems is assigned to one of the user-selectable music stem categories, and each of the user-selectable music stem categories is configured to expand and display one or more music stem indicators of the music stems assigned to the music stem category upon receiving a user selection of the user-selectable music stem category.

With reference now to FIG. 8C, at 260 the method 200 includes, wherein the first user-selectable mixing button is displayed with each user-selectable music stem category of the plurality of user-selectable music stem categories, the first mixing button configured to add all the music stems within the corresponding user-selectable music stem category to the user song mix. At 264 the method 200 includes, wherein the second user-selectable mixing button is displayed with each user-selectable music stem category of the plurality of user-selectable music stem categories, the second mixing button configured to remove all the music stems within the corresponding user-selectable music stem category from the user song mix. At 268 the method 200 includes, wherein the customization window further comprises a user-adjustable volume level adjuster displayed with each user-selectable music stem category of the plurality of user-selectable music stem categories, the user-adjustable volume level adjuster configured to adjust a volume of all of the music stems within the corresponding user-selectable music stem category in the user song mix.

Accordingly and as described above, the unique presentations and groupings of user-selectable functional features in the music customization graphical user interfaces of the present disclosure enable users to quickly, easily, and efficiently customize selected songs and/or music stems and download the results in a user song mix. In this manner, by providing users with an intuitive, easy-to-use solution for selecting and customizing music stems from selected songs to match their story or particular artistic needs, the methods, computing devices, and interfaces of the present disclosure enable users to easily customize and download licensed digital music and music stems.

Figure 9:
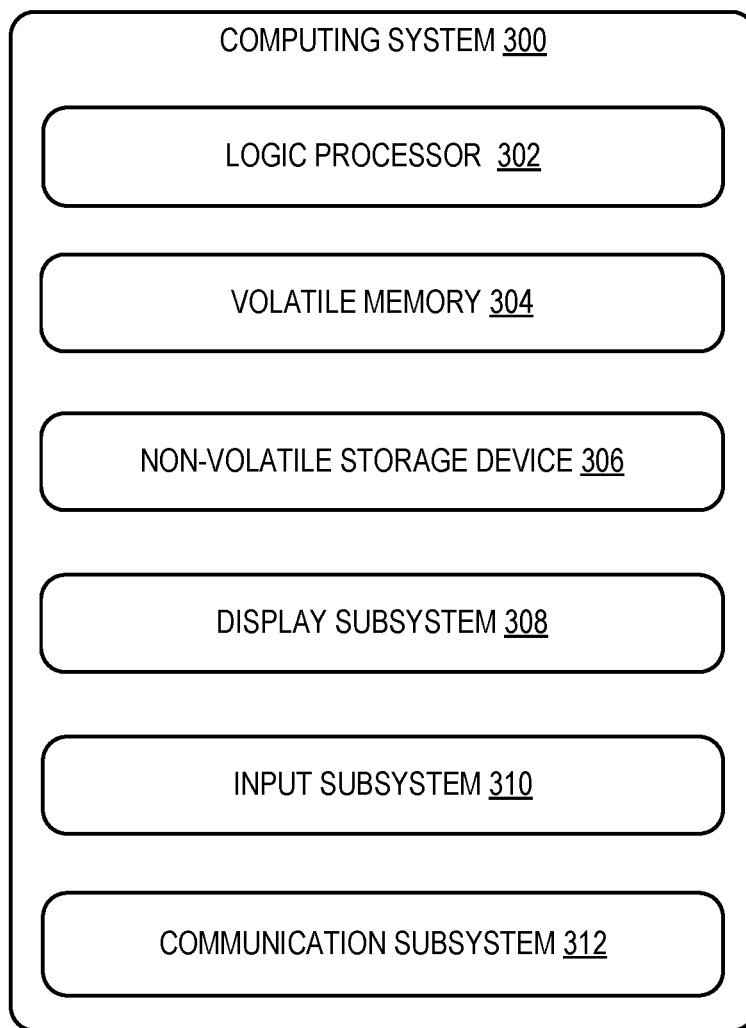
FIG. 9 is a simplified schematic illustration of an embodiment of a computing device.

FIG. 9 schematically shows a non-limiting embodiment of a computing system 300 that can enact one or more of the methods and processes described above. Computing system 300 is shown in simplified form. Computing system 300 may take the form of one or more personal computers, server computers, tablet computers, home-entertainment computers, gaming devices, mobile computing devices, mobile communication devices (e.g., smart phone), wearable computing devices, and/or other computing devices. The host computing device 14, first user computing device 18, second user computing device 20, and third user computing device 22 described above may comprise computing system 300 or one or more aspects of computing system 300.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, trackpad (virtual or physical), electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The term "program" may be used to describe an aspect of the present disclosure that is implemented to perform one or more particular functions. In some cases, such a program may be instantiated via logic subsystem 304 executing instructions held by storage subsystem 308. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

The following paragraphs provide additional support for the claims of the subject application. One aspect provides a host computing device for providing a music customization graphical user interface to a user computing device, the host computing device comprising: a communication subsystem for communicatively coupling the host computing device to the user computing device; a logic subsystem; and a storage subsystem comprising instructions executable by the logic subsystem to send the music customization graphical user interface to the user computing device, the music customization graphical user interface comprising: a plurality of user-selectable song name selectors configured to receive user input, wherein each of the user-selectable song name selectors corresponds to a different song, and a selected song name selector of the plurality of song name selectors is selected by a user; a music player region comprising a title of a selected song that corresponds to the selected song name selector, a user-selectable play button, and a user-selectable song customization selector, wherein the selected song comprises a plurality of music stems; a customization window comprising: a plurality of music stem indicators that each correspond to at least one music stem of the plurality of music stems; and a plurality of user-selectable mixing buttons comprising: a first user-selectable mixing button corresponding to each music stem indicator of the plurality of music stem indicators, the first mixing button configured to add the music stem corresponding to a nearest music stem indicator to a user song mix; and a second user-selectable mixing button located adjacent to the first mixing button, the user-selectable second mixing button configured to remove the music stem corresponding to the nearest music stem selector from the user song mix; and a user-selectable download button configured to download a file comprising the user song mix to the user computing device. The host computing device may additionally or alternatively include displaying the customization window in response to a user selection of the song customization selector. The host computing device may additionally or alternatively include, wherein the customization window further comprises a user-adjustable volume level adjuster displayed with each music stem indicator of the plurality of music stem indicators, the user-adjustable volume level adjuster configured to adjust a volume of the corresponding music stem within the user song mix. The host computing device may additionally or alternatively include, wherein the customization window further comprises a user-adjustable pitch adjuster displayed with one or more of the music stem indicators, the user-adjustable pitch adjuster configured to adjust a pitch of the corresponding music stem within the user song mix.

The host computing device may additionally or alternatively include, wherein the customization window further comprises a user-adjustable tempo adjuster configured to adjust a tempo of the user song mix. The host computing device may additionally or alternatively include, wherein the customization window further comprises a plurality of user-selectable music stem categories, wherein each music stem of the plurality of music stems is assigned to one of the user-selectable music stem categories, and each of the user-selectable music stem categories is configured to expand and display one or more music stem indicators of the music stems assigned to the music stem category upon receiving a user selection of the user-selectable music stem category. The host computing device may additionally or alternatively include, wherein the first user-selectable mixing button is displayed with each user-selectable music stem category of the plurality of user-selectable music stem categories, the first mixing button configured to add all of the music stems within the corresponding user-selectable music stem category to the user song mix; and the second user-selectable mixing button is displayed with each user-selectable music stem category of the plurality of user-selectable music stem categories, the second mixing button configured to remove all of the music stems within the corresponding user-selectable music stem category from the user song mix. The host computing device may additionally or alternatively include, wherein the customization window further comprises a user-adjustable volume level adjuster displayed with each user-selectable music stem category of the plurality of user-selectable music stem categories, the user-adjustable volume level adjuster configured to adjust a volume of all of the music stems within the corresponding user-selectable music stem category in the user song mix. The host computing device may additionally or alternatively include, wherein the customization window further comprises a user-adjustable pitch adjuster displayed with one or more of the selectable music stem categories, the user-adjustable pitch adjuster configured to adjust a pitch of all of the music stems within the corresponding music stem category within the user song mix.

The host computing device may additionally or alternatively include, wherein the customization window further comprises a plurality of user-selectable preset mix indicators, wherein each of the plurality of user-selectable preset mix indicators corresponds to a different collection of music stems from the plurality of music stems. The host computing device may additionally or alternatively include, wherein the customization window further comprises a waveform region displayed for each of the music stem indicators, wherein the waveform region is configured to receive a user volume selection and to adjust a volume of the corresponding music stem based on a location of the user volume selection within the waveform region.

Another aspect provides a method for providing a music customization graphical user interface to a user computing device, the method comprising: sending the music customization graphical user interface to the user computing device, the music customization graphical user interface comprising: a plurality of user-selectable song name selectors configured to receive user input, wherein each of the user-selectable song name selectors corresponds to a different song, and a selected song name selector of the plurality of song name selectors is selected by a user; a music player region comprising a title of a selected song that corresponds to the selected song name selector, a user-selectable play button, and a user-selectable song customization selector, wherein the selected song comprises a plurality of music stems; and a customization window comprising: a plurality of music stem indicators that each correspond to at least one music stem of the plurality of music stems; and a plurality of user-selectable mixing buttons comprising: a first user-selectable mixing button corresponding to each music stem indicator of the plurality of music stem indicators, the first mixing button configured to add the music stem corresponding to a nearest music stem selector to a user song mix; and a second user-selectable mixing button located adjacent to the first mixing button, the second mixing button configured to remove the music stem corresponding to the nearest music stem selector from the user song mix; and a user-selectable download button configured to download a file comprising the user song mix to the user computing device. The method may additionally or alternatively include displaying the customization window in response to a user selection of the song customization selector. The method may additionally or alternatively include, wherein the customization window further comprises a user-adjustable volume level adjuster displayed with each music stem indicator of the plurality of music stem indicators, the user-adjustable volume level adjuster configured to adjust a volume of the corresponding music stem within the user song mix.

The method may additionally or alternatively include, wherein the customization window further comprises a user-adjustable pitch adjuster displayed with one or more of the music stem indicators, the user-adjustable pitch adjuster configured to adjust a pitch of the corresponding music stem within the user song mix. The method may additionally or alternatively include, wherein the customization window further comprises a user-adjustable tempo adjuster configured to adjust the tempo of the user song mix. The method may additionally or alternatively include, wherein the customization window further comprises a plurality of user-selectable music stem categories, wherein each music stem of the plurality of music stems is assigned to one of the user-selectable music stem categories, and each of the user-selectable music stem categories is configured to expand and reveal one or more of the music stems within the music stem category upon receiving a user selection of the user-selectable music stem category. The method may additionally or alternatively include, wherein the first user-selectable mixing button is displayed with each user-selectable music stem category of the plurality of user-selectable music stem categories, the first mixing button configured to add all of the music stems within the corresponding user-selectable music stem category to the user song mix; and the second user-selectable mixing button is displayed with each user-selectable music stem category of the plurality of user-selectable music stem categories, the second mixing button configured to remove all of the music stems within the corresponding user-selectable music stem category from the user song mix. The method may additionally or alternatively include, wherein the customization window further comprises a user-adjustable volume level adjuster displayed with each user-selectable music stem category of the plurality of user-selectable music stem categories, the user-adjustable volume level adjuster configured to adjust a volume of all of the music stems within the corresponding user-selectable music stem category in the user song mix.

Another aspect provides, on a user computing device, a method for providing a music customization graphical user interface, the method comprising: displaying the music customization graphical user interface on a display of the user computing device, the music customization graphical user interface comprising: a plurality of user-selectable song name selectors configured to receive user input, wherein each of the user-selectable song name selectors corresponds to a different song, and a selected song name selector of the plurality of song name selectors is selected by a user; a music player region comprising a title of a selected song that corresponds to the selected song name selector, a user-selectable play button, and a user-selectable song customization selector, wherein the selected song comprises a plurality of music stems; and a customization window comprising: a plurality of music stem indicators that each correspond to at least one music stem of the plurality of music stems; and a plurality of user-selectable mixing buttons comprising: a first user-selectable mixing button corresponding to each music stem indicator of the plurality of music stem indicators, the first mixing button configured to add the music stem corresponding to a nearest music stem selector to a user song mix; and a second user-selectable mixing button located adjacent to the first mixing button, the second mixing button configured to remove the music stem corresponding to the nearest music stem selector from the user song mix; and a user-selectable download button configured to download a file comprising the user song mix to the user computing device.

It is to be understood that the configurations and/or approaches described herein are exemplary in nature, and that these specific embodiments or examples are not to be considered in a limiting sense. The specific routines or methods described herein may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

It will also be appreciated that references to "one embodiment", "an embodiment", "one example", or "an example" are not intended to be interpreted as excluding the existence of additional embodiments or examples that also incorporate the recited features. Unless explicitly stated to the contrary, embodiments or examples "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," and "second," etc. are used merely as labels, and are not intended to impose numerical requirements or a particular positional order on their objects.

The invention claimed is:

1. A host computing device for providing a music customization graphical user interface to a user computing device, the host computing device comprising:
   a communication subsystem for communicatively coupling the host computing device to the user computing device;
   a logic subsystem; and
   a storage subsystem comprising instructions executable by the logic subsystem to send the music customization graphical user interface to the user computing device, the music customization graphical user interface comprising:
      a plurality of user-selectable song name selectors configured to receive user input, wherein each of the user-selectable song name selectors corresponds to a different song, and a selected song name selector of the plurality of song name selectors is selected by a user;
      a music player region comprising a title of a selected song that corresponds to the selected song name selector, a user-selectable play button, and a user-selectable song customization selector, wherein the selected song comprises a plurality of music stems;
      a customization window comprising:
         a plurality of music stem indicators that each correspond to at least one music stem of the plurality of music stems; and
         a plurality of user-selectable mixing buttons comprising:
            a first user-selectable mixing button corresponding to each music stem indicator of the plurality of music stem indicators, the first mixing button configured to add the music stem corresponding to a music stem indicator horizontally aligned with the first mixing button to a user song mix; and
            a second user-selectable mixing button located adjacent to the first mixing button, the user-selectable second mixing button configured to remove the music stem corresponding to the music stem selector horizontally aligned with the first mixing button from the user song mix; and
      a user-selectable download button configured to download a file comprising the user song mix to the user computing device.

2. The host computing device of claim 1, further comprising displaying the customization window in response to a user selection of the song customization selector.

3. The host computing device of claim 1, wherein the customization window further comprises a user-adjustable volume level adjuster displayed with each music stem indicator of the plurality of music stem indicators, the user-adjustable volume level adjuster configured to adjust a volume of the corresponding music stem within the user song mix.

4. The host computing device of claim 1, wherein the customization window further comprises a user-adjustable pitch adjuster displayed with one or more of the music stem indicators, the user-adjustable pitch adjuster configured to adjust a pitch of the corresponding music stem within the user song mix.

5. The host computing device of claim 1, wherein the customization window further comprises a user-adjustable tempo adjuster configured to adjust a tempo of the user song mix.

6. The host computing device of claim 1, wherein the customization window further comprises a plurality of user-selectable music stem categories, wherein each music stem of the plurality of music stems is assigned to one of the user-selectable music stem categories, and each of the user-selectable music stem categories is configured to expand and display one or more music stem indicators of the music stems assigned to the music stem category upon receiving a user selection of the user-selectable music stem category.

7. The host computing device of claim 6, wherein:
the first user-selectable mixing button is displayed with each user-selectable music stem category of the plurality of user-selectable music stem categories, the first mixing button configured to add all of the music stems within the corresponding user-selectable music stem category to the user song mix; and
the second user-selectable mixing button is displayed with each user-selectable music stem category of the plurality of user-selectable music stem categories, the second mixing button configured to remove all of the music stems within the corresponding user-selectable music stem category from the user song mix.

8. The host computing device of claim 6, wherein the customization window further comprises a user-adjustable volume level adjuster displayed with each user-selectable music stem category of the plurality of user-selectable music stem categories, the user-adjustable volume level adjuster configured to adjust a volume of all of the music stems within the corresponding user-selectable music stem category in the user song mix.

9. The host computing device of claim 6, wherein the customization window further comprises a user-adjustable pitch adjuster displayed with one or more of the selectable music stem categories, the user-adjustable pitch adjuster configured to adjust a pitch of all of the music stems within the corresponding music stem category within the user song mix.

10. The host computing device of claim 1, wherein the customization window further comprises a plurality of user-selectable preset mix indicators, wherein each of the plurality of user-selectable preset mix indicators corresponds to a different collection of music stems from the plurality of music stems.

11. The host computing device of claim 1, wherein the customization window further comprises a waveform region displayed for each of the music stem indicators, wherein the waveform region is configured to receive a user volume selection and to adjust a volume of the corresponding music stem based on a location of the user volume selection within the waveform region.

12. A method for providing a music customization graphical user interface to a user computing device, the method comprising:
sending the music customization graphical user interface to the user computing device, the music customization graphical user interface comprising:
a plurality of user-selectable song name selectors configured to receive user input, wherein each of the user-selectable song name selectors corresponds to a different song, and a selected song name selector of the plurality of song name selectors is selected by a user;
a music player region comprising a title of a selected song that corresponds to the selected song name selector, a user-selectable play button, and a user-selectable song customization selector, wherein the selected song comprises a plurality of music stems; and
a customization window comprising:
a plurality of music stem indicators that each correspond to at least one music stem of the plurality of music stems; and
a plurality of user-selectable mixing buttons comprising:
a first user-selectable mixing button corresponding to each music stem indicator of the plurality of music stem indicators, the first mixing button configured to add the music stem corresponding to a music stem selector horizontally aligned with the first mixing button to a user song mix; and
a second user-selectable mixing button located adjacent to the first mixing button, the second mixing button configured to remove the music stem corresponding to the music stem selector horizontally aligned with the first mixing button from the user song mix; and
a user-selectable download button configured to download a file comprising the user song mix to the user computing device.

13. The method of claim 12, further comprising displaying the customization window in response to a user selection of the song customization selector.

14. The method of claim 12, wherein the customization window further comprises a user-adjustable volume level adjuster displayed with each music stem indicator of the plurality of music stem indicators, the user-adjustable volume level adjuster configured to adjust a volume of the corresponding music stem within the user song mix.

15. The method of claim 12, wherein the customization window further comprises a user-adjustable pitch adjuster displayed with one or more of the music stem indicators, the user-adjustable pitch adjuster configured to adjust a pitch of the corresponding music stem within the user song mix.

16. The method of claim 12, wherein the customization window further comprises a user-adjustable tempo adjuster configured to adjust the tempo of the user song mix.

17. The method of claim 12, wherein the customization window further comprises a plurality of user-selectable music stem categories, wherein each music stem of the plurality of music stems is assigned to one of the user-selectable music stem categories, and each of the user-selectable music stem categories is configured to expand and reveal one or more of the music stems within the music stem category upon receiving a user selection of the user-selectable music stem category.

18. The method of claim 17, wherein:
the first user-selectable mixing button is displayed with each user-selectable music stem category of the plurality of user-selectable music stem categories, the first mixing button configured to add all of the music stems within the corresponding user-selectable music stem category to the user song mix; and
the second user-selectable mixing button is displayed with each user-selectable music stem category of the plurality of user-selectable music stem categories, the second mixing button configured to remove all of the music stems within the corresponding user-selectable music stem category from the user song mix.

19. The method of claim 17, wherein the customization window further comprises a user-adjustable volume level adjuster displayed with each user-selectable music stem category of the plurality of user-selectable music stem categories, the user-adjustable volume level adjuster configured to adjust a volume of all of the music stems within the corresponding user-selectable music stem category in the user song mix.

20. On a user computing device, a method for providing a music customization graphical user interface, the method comprising:

displaying the music customization graphical user interface on a display of the user computing device, the music customization graphical user interface comprising:

a plurality of user-selectable song name selectors configured to receive user input, wherein each of the user-selectable song name selectors corresponds to a different song, and a selected song name selector of the plurality of song name selectors is selected by a user;

a music player region comprising a title of a selected song that corresponds to the selected song name selector, a user-selectable play button, and a user-selectable song customization selector, wherein the selected song comprises a plurality of music stems; and a customization window comprising:

a plurality of music stem indicators that each correspond to at least one music stem of the plurality of music stems; and a plurality of user-selectable mixing buttons comprising:

a first user-selectable mixing button corresponding to each music stem indicator of the plurality of music stem indicators, the first mixing button configured to add the music stem corresponding to a music stem selector horizontally aligned with the first mixing button to a user song mix; and a second user-selectable mixing button located adjacent to the first mixing button, the second mixing button configured to remove the music stem corresponding to the music stem selector horizontally aligned with the first mixing button from the user song mix; and a user-selectable download button configured to download a file comprising the user song mix to the user computing device.

* * * * *